United States Patent [19]

Saito

[11] 4,006,942
[45] Feb. 8, 1977

[54] ANTILOCK SYSTEM FOR WHEELED VEHICLES

[76] Inventor: Masashi Saito, No. 11-1, 3-chome, Kasugadai, Aikawa, Aiko, Kanagawa, Japan

[22] Filed: Nov. 17, 1975

[21] Appl. No.: 632,820

Related U.S. Application Data

[63] Continuation of Ser. No. 500,087, Aug. 23, 1974, abandoned.

[30] Foreign Application Priority Data

Sept. 14, 1973 Japan ............................ 48-104085
Apr. 25, 1974 Japan ............................ 49-46835
May 28, 1974 Japan ............................ 49-59985

[52] U.S. Cl. .............................. 303/109; 303/20; 303/106
[51] Int. Cl.² ...................... B60T 8/10; B60T 8/08
[58] Field of Search ........... 188/181 C; 303/20, 21, 303/106, 109; 307/10 R; 317/5; 324/161; 340/53, 62

[56] References Cited
UNITED STATES PATENTS

| 3,744,855 | 7/1973 | Ochiai ........................ 303/21 BE |
|---|---|---|
| 3,804,470 | 4/1974 | Slavin et al. .................. 303/21 BE |
| 3,807,811 | 4/1974 | Nakamura et al. ............ 303/21 BE |
| 3,811,739 | 5/1974 | Nakamura et al. ............ 303/21 BE |
| 3,822,921 | 7/1974 | Jones ............................ 303/21 BE |
| 3,832,008 | 8/1974 | Leiber et al. .................. 303/21 BE |
| 3,848,933 | 11/1974 | Ochiai .......................... 303/21 BE |

*Primary Examiner*—Stephen G. Kunin
*Attorney, Agent, or Firm*—Bacon & Thomas

[57] ABSTRACT

An antilock system for wheeled vehicles, wherein a reference velocity signal waveform which is obtained without differentiating the actual wheel velocity signal, is compared with the latter, thereby determining a point of time when brake pressure is to be relieved and/or a point of time when such brake pressure relief is to be stopped. Furthermore, in case an anomalous drop occurs in the wheel velocity, an additional reference velocity signal is obtained on the basis of the actual wheel velocity signal but without differentiating the latter, and it is compared with the actual wheel velocity signal, whereby the point of time when the brake pressure relief is to be stopped can be changed so as to cope with the anomalous drop of the wheel velocity.

10 Claims, 14 Drawing Figures

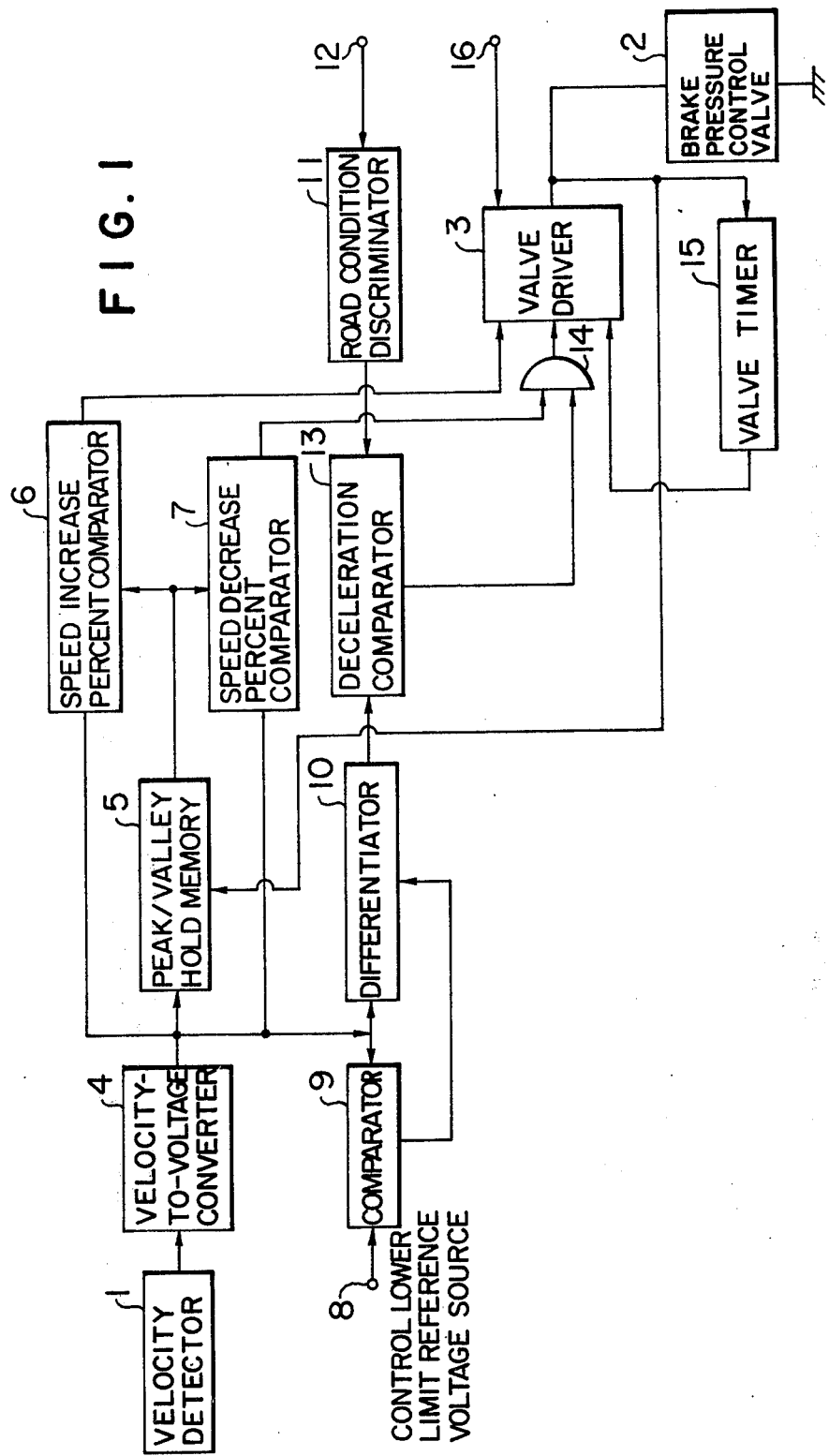

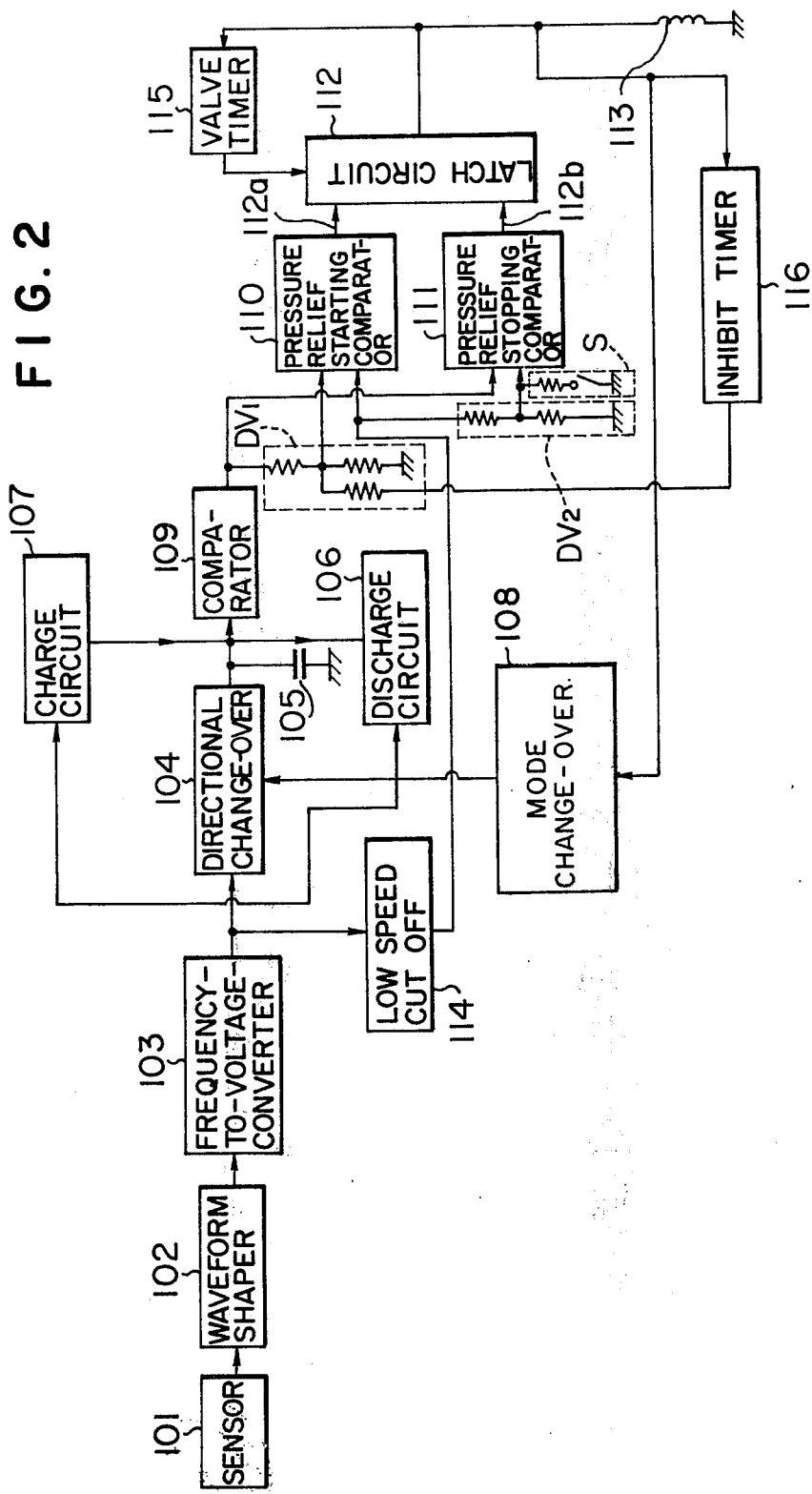

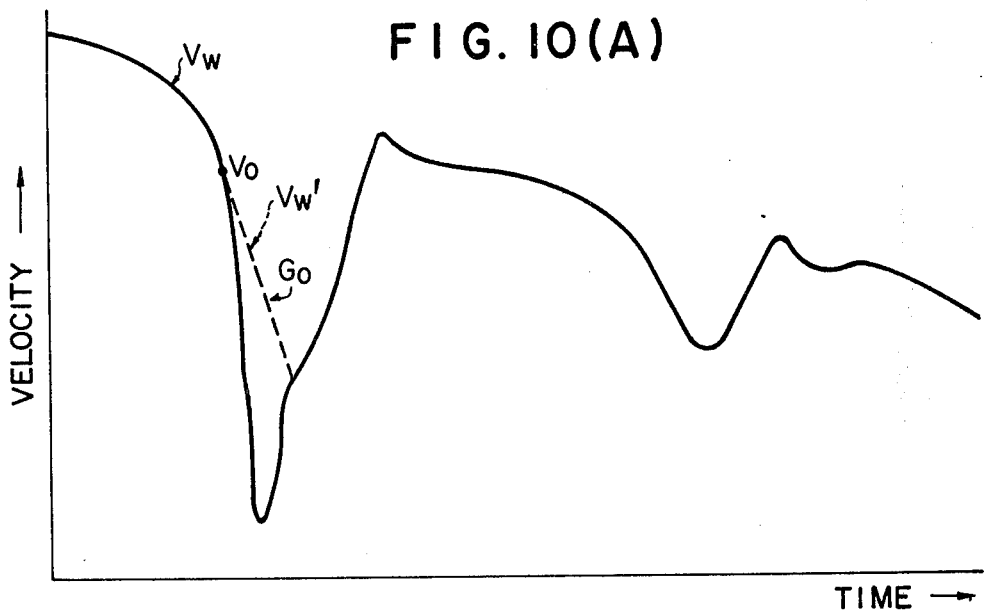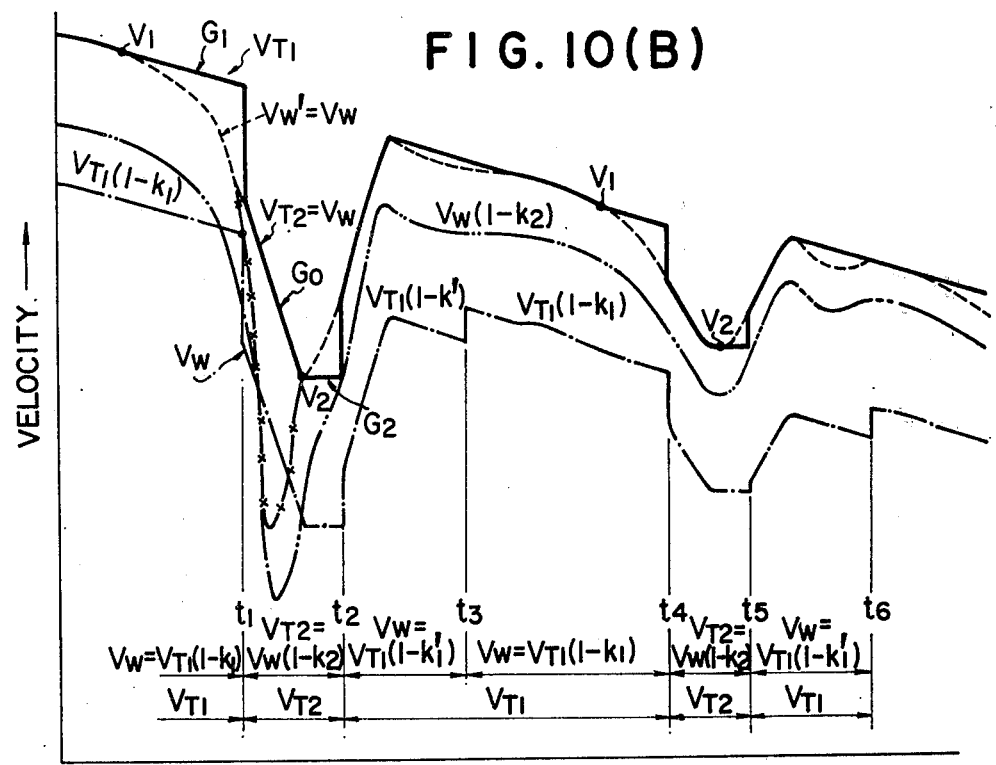

ANTILOCK SYSTEM FOR WHEELED VEHICLES

This is a continuation, of application Ser. No. 500,087, filed Aug. 23, 1974, now abandoned. This invention relates to an antilock system for wheeled vehicles.

As is well known in the art, there is a tendency that when a braking force is imparted to a vehicle such for example as automobile while the latter is running, the wheels thereof may be locked so that so-called skid conditions may occur. In order to prevent such wheel locking, therefore, various types of control systems have heretofore been proposed, and most of such prior art systems use an acceleration or deceleration signal obtained by differentiating the actual wheel velocity signal as a control parameter to control the brake pressure. With such systems, however, difficulties have been encountered in securing sufficient control due to the fact that various noises tend to result from the differentiation of the wheel velocity. More specifically, in the control systems, a control point where the brake pressure is to be relieved is set up by using a logical product of a deceleration $G_1$ below a predetermined limit and the rate of reduction of the wheel velocity with respect to that at the $G_1$ point, whereas a control point where the brake pressure relief is to be stopped is set up by using a predetermined differentiation value at which either an acceleration occurs or the wheel velocity restores in the accelerating direction. With such systems, it is possible to obtain a substantially satisfactory result with respect to the control for determining the point where the brake pressure is to be relieved, but with respect to the control for determining the point where the brake pressure relief is to be stopped, there is a tendency that the pressure relief becomes insufficient in the case of a noisy signal due to the fact that only differentiation is resorted to. Thus, in the case where an attempt is made to detect a velocity signal by means of propeller sensing instead of wheel sensing in order to make the system inexpensive for example, the tendency that a noisy waveform occurs, becomes remarkable; in such a case, therefore, it is difficult to achieve satisfactory performance by the aforementioned conventional system.

Accordingly, it is an object of this invention to provide a novel method which is capable of avoiding the above-described disadvantages of the prior-art systems, and yet producing a positive antiskid effect with a greatly simplified arrangement.

Another object of this invention is to provide an antiskid system wherein a signal which is proportional to the wheel velocity is taken out to be used as a control parameter, the peak or valley of the signal thus taken out is stored and held for each control cycle, and a ratio control is effected in combination with a control using a differentiation value (acceleration or deceleration).

A further object of this invention is to provide an antilock system for wheeled vehicles, wherein a reference velocity signal waveform is obtained without differentiating a signal waveform corresponding to the actual wheel velocity, and said two signals are compared with each other under the conditions which will be mentioned hereinafter, thereby determining the point where brake pressure is to be relieved and the point where such relief of brake pressure is to be eliminated.

A still further object of this invention is to provide an antilock system for wheeled vehicles, wherein in case the wheel velocity is anomalously decreased, a reference velocity signal defining a deceleration limit is obtained on the basis of a signal corresponding to the actual wheel velocity without differentiating the actual wheel velocity signal, and said two signals are compared with each other under conditions which will be described hereinafter, whereby the point of time when the relief of brake pressure is to be eliminated, is changed so as to cope with such anomalous deceleration.

Other objects, features and advantages of this invention will become apparent from the following description taken in conjunction with the accompanying drawings.

FIG. 1 is a block diagram showing the antiskid system according to an embodiment of this invention.

FIG. 2 is a block diagram showing the antilock system according to another embodiment of this invention.

FIGS. 10A–10C illustrate waveforms occurring in the system of FIG. 8.

Figure 3A:
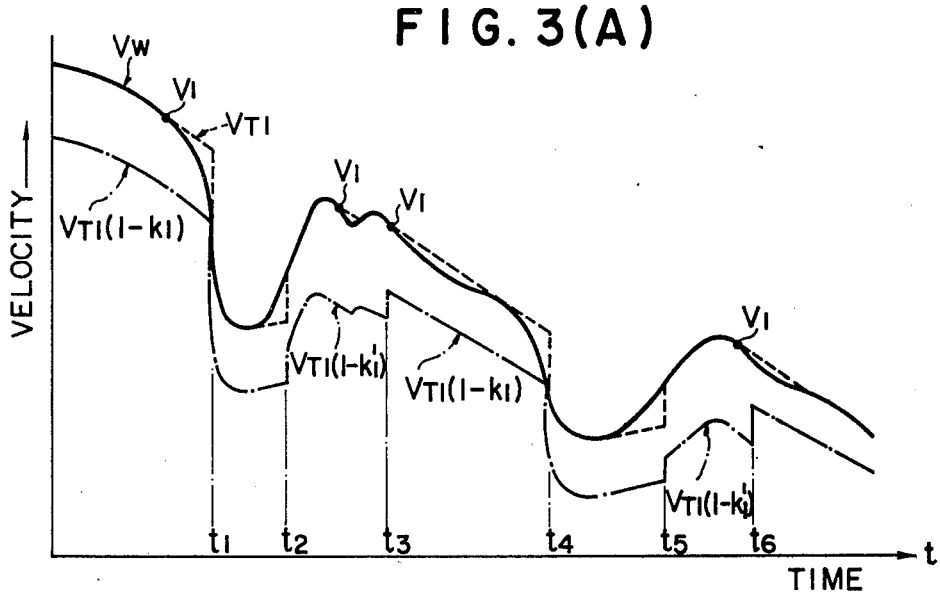
FIGS. 3A through 3C illustrate waveforms occurring in the system shown in FIG. 2.

Referring first to FIG. 1 of the drawings, there is shown the antiskid system according to an embodiment of this invention, which includes velocity detecting means 1 which is provided in association with the wheels of a wheeled vehicle such for example as automobile (not shown) and adapted to generate a signal (referred to as wheel velocity signal hereinafter) which is proportional to the wheel velocity, a brake pressure control valve 2, and a valve driver 3 for driving the control valve 2. The wheel velocity signal available from the velocity detecting means 1 is passed to a peak or valley hold memory circuit 5 through a velocity-to-voltage converter circuit 4, so that the valley or peak of the wheel velocity signal is held in the circuit 5. At the same time, the wheel velocity signal which has been passed through the converter circuit 4, is also transmitted to a speed increase percent comparator circuit 6 and speed decrease percent comparator circuit 7. The memory circuit 5 has its output connected to one input terminal of each of the comparator circuits 6 and 7.

A control lower limit reference voltage source 8 is adapted to provide its reference voltage to one of the input terminals of a comparator circuit 9, the other input terminal of which is connected to the output of the velocity-to-voltage converter circuit 4. The output of the comparator circuit 9 is connected to one input of a differentiator circuit 10 which has the other input thereof connected to the output of the converter circuit 4. The output of the differentiator circuit 10 is connected to one input of a deceleration comparator circuit 13, the other input of which is coupled to a wheel deceleration information source 12 through a circuit 11. The deceleration comparator circuit 13 is adapted to prove that an anomalous deceleration has occurred. The foregoing circuit 11 is so designed as to discriminate road conditions as to whether the road surface is of asphalt or ice, for example.

The output of the speed increase percent comparator circuit 6 is connected to one of the input terminals of the valve driver 3, and the outputs of the speed decrease percent comparator circuit 7 and deceleration comparator circuit 13 are connected to the other input terminal of the valve driver 3 through an AND circuit 14. There is provided a valve timer 15 which operates as one type of fail-safe circuit and serves to limit the maximum time length for which the valve is open. The valve timer 15 has the input thereof connected to the output of the valve driver 3 and the output thereof connected to one of the remaining two input terminals of the valve driver 3. Part of the output of the valve driver 3 is provided to the memory circuit 5 as a mode change-over signal. Reference numeral 16 indicates a brake signal terminal.

As will be appreciated from what has been described above, in accordance with this embodiment of the invention, control can be effected by way of percent of velocity change by storing the peak or valley of each cycle of a signal proportional to the wheel velocity by means of the peak or valley hold circuit, whereby early lock can be prevented so that response at a low velocity becomes possible.

Figure 3B:
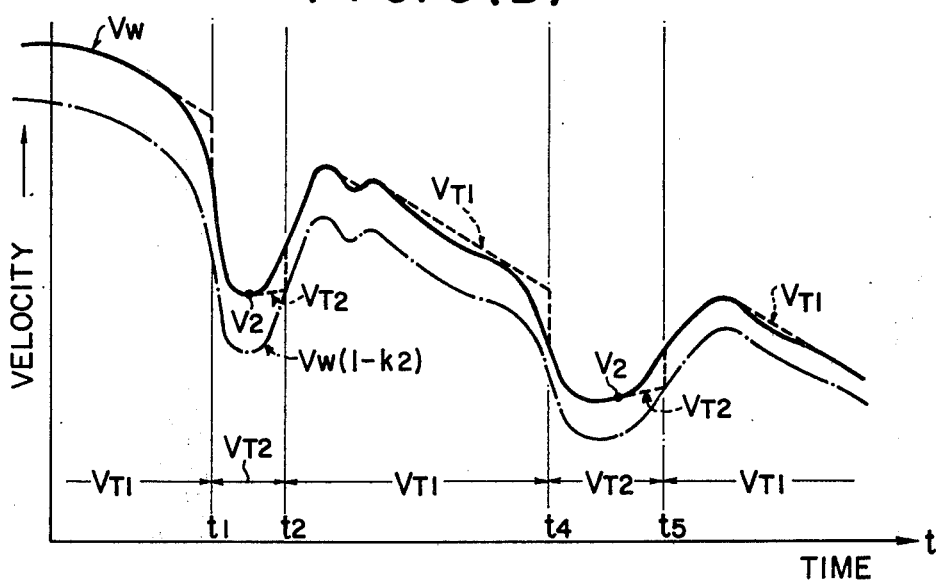

Referring now to FIG. 2, there is shown another embodiment of this invention, wherein the actual velocity of the wheels of a vehicle (not shown) is detected by means of a sensor 101 which is provided in direct or indirect association with the wheels. An output waveform available from the sensor 101 is in turn shaped in a waveform shaping circuit 102, and then passed to a frequency-to-voltage converter circuit 103, which provides at the output thereof a waveform $V_W$ (referred to as actual wheel velocity signal waveform hereinafter) which corresponds to the actual wheel velocity, as shown in FIGS. 3A and 3B.

Figure 3C:
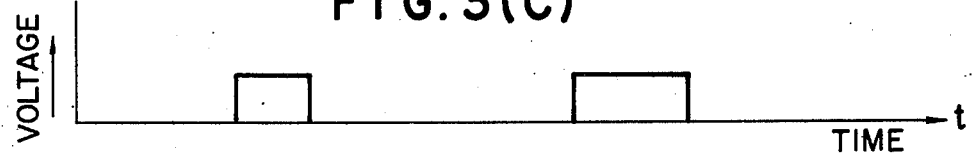
Figure 4:
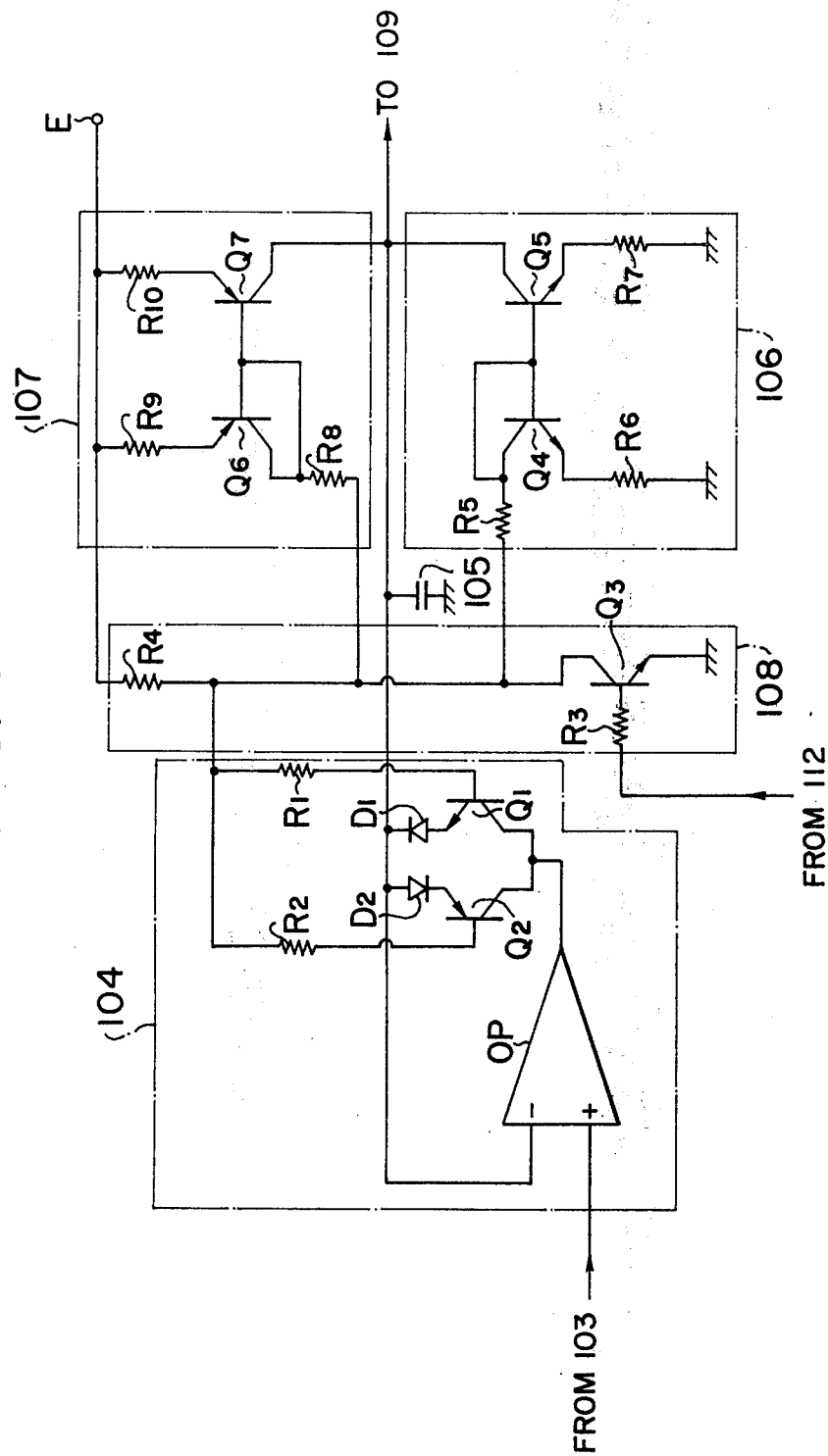
FIG. 4 is a circuit diagram showing the important portion of the embodiment shown in FIG. 2.

At the output side of the converter circuit 103 is provided a directional change-over circuit 104, the output of which is grounded through a capacitor 105. An example of the change-over circuit 104 is shown in FIG. 4. A current discharge circuit 106 and a current charge circuit 107 are tied to the connection point between the output terminal of the change-over circuit 104 and the capacitor 105. Examples of the circuits 106 and 107 are shown in FIG. 4. These circuits 106 and 107 are adapted to operate on the capacitor 105 while being switched in the below-mentioned manner by a mode change-over circuit 108, an example of which is shown in FIG. 4. The change-over circuit 108 is connected to the circuit 104 and serves to switch the directionality of the circuit 104 in such a manner as explained later. The discharge circuit 106 and charge circuit 107 have a discharge rate and charge rate corresponding to predetermined deceleration $G_1$ and acceleration $G_2$ respectively. Reference numeral 109 denotes an isolator circuit, 110 represents a pressure relief starting comparator circuit, and 111 indicates a pressure relief stopping comparator. The comparator 110 is connected to the set input terminal 112a of a latch circuit 112 which may be constituted by a monostable multivibrator or the like, for example, and the comparator 111 is coupled to the reset input terminal 112b of the latch circuit 112. $DV_1$ and $DV_2$ are divider circuits for setting up references to be compared with the signal waveform. There is also provided a dividing ratio change-over circuit S for more finely adjusting the pressure application point depending on the road condition. The latch circuit 112 provides at the output thereof such a control signal as shown in FIG. 3c, which is in turn transmitted to a solenoid 113 associated with a brake pressure control valve (not shown), so that a desired control of the brake pressure can be effected. Reference numeral 114 indicates a low speed cut off circuit, 115 a valve timer, and 116 an inhibit timer. The functions of these elements will be described later.

Description will now be made of the important portion of this embodiment shown in FIG. 4.

As shown in the drawing, the aforementioned directional change-over circuit 104 may comprise an operational amplifier OP, transistors $Q_1$ and $Q_2$, and resistors $R_1$ and $R_2$. In the pressure relief starting command detection mode, the pressure relieving valve is inoperative, so that in the mode change-over circuit 108 constituted by a transistor $Q_3$ and resistors $R_3$ and $R_4$, the transistor $Q_3$ is rendered nonconductive. Thus, the transistor $Q_1$ of the directional change-over circuit 104 is now turned on through the resistors $R_1$ and $R_2$, so that the output current of the operational amplifier OP is imparted to charge the capacitor 105 through the transistor $Q_1$ and a diode $D_1$. At this point, the voltage across the capacitor 105 becomes equal to the input voltage, or the voltage $V_W$ corresponding to the actual wheel velocity, since the operational amplifier functions as a voltage follower. The capacitor 105 is connected to the discharge circuit 106, which may be constituted by transistors $Q_4$, $Q_5$ and resistors $R_5$, $R_6$, $R_7$ as shown in the drawing. The discharge circuit 106 has a discharge rate which corresponds to a predetermined deceleration $G_1$ depending upon the constants of the elements constituting the discharge circuit. Thus, when the actual wheel velocity voltage $V_W$ builds up, the voltage $V_{T1}$ across the capacitor 105 builds up correspondingly, whereas when $V_W$ drops below a point $V_1$ as shown in FIG. 3A, the relationship between $V_W$ and $V_{T1}$ becomes $V_W < V_{T1}$. At this point, the current from the operational amplifier OP is cut off by the transistor $Q_1$ and diode $D_1$ due to the fact that the voltage between the (+) and (−) input terminals of the operational amplifier is always zero. Consequently, the charging with respect to the capacitor 105 is stopped, so that the voltage across the capacitor drops with a gradient corresponding to the aforementioned discharge rate as defined by $$V = V_1 - \frac{1}{C} \int i_1 \, dt$$

where $i_1$ is the discharge current. In this case, if the drop rate of the actual wheel velocity voltage $V_W$ is lower than $$-\frac{1}{C} \int i_1 \, dt$$

the voltage across the capacitor 105 will again reach a new $V_W$ and vary following the actual wheel velocity voltage. At a point where the drop rate of the actual wheel velocity voltage $V_W$ becomes higher than $$-\frac{1}{C}\int i_1\,dt$$

the aforementioned control signal is generated, and it will last until the resulting voltage drop again agrees with the value of $V_W$. Thus, unless the waveform $V_W$ representing the actual wheel velocity and the voltage $V_{T1}$ across the capacitor 105 representing a line with a gradient $G_1$ tangential to the waveform $V_W$ cross each other again, any change in the waveform $V_W$ will have no influence even if there is such a waveform change rate as defined by $$-\frac{1}{C}\int i_1\,dt$$

which occurs when use is made of a differentiator.

In this way, the actual wheel velocity voltage $V_W$ is applied to one of the input terminals of the comparator 110 through the circuit 114. To the other input terminal of the comparator 110 is applied a voltage $V_{T1}(1-k_1)$ (see FIG. 3A) which is obtained by dividing the voltage $V_{T1}$ across the capacitor 105 serving as reference velocity voltage by means of the divider circuit $DV_1$, that is, by multiplying the capacitor voltage by a reference velocity drop rate. The comparator 110 compares the two voltages, and thus it provides an output at a point of time when the relationship between these voltages becomes $V_W \leq V_{T1}(1-k_1)$, that is, at a point of time $t_1$ as shown in FIG. 3A. The output of the comparator is transmitted to set the latch circuit 112 so that such a control signal as shown in FIG. 3C is provided to the solenoid 113, thereby starting brake pressure relief. In other words, the brake pressure relief can be started at a point of time when $V_W$ drops so that the relationship of $V_W < V_{T1}(1-k_1)$ holds. From this, it will be seen that the following relationship holds true $$V_{W1}(1-G_1t)(1-k_1) = V_W$$

where $V_{W1}$ is the wheel velocity at the point where the reference deceleration $G_1$ occurs, and thus that the apparent slip control rate $\mu$ can be expressed as follows:

$$\mu = V_{Wf}V_{W1} - (1-G_1t)(1-k_1)$$

When the solenoid 113 is energized in accordance with the command for brake pressure relief, an input voltage is applied to the transistor $Q_3$ of the mode change-over circuit 108 through resistor $R_3$, so that the transistor is rendered conductive. As a result, the transistor $Q_1$ of the directional change-over circuit 104 is rendered non-conductive while the transistor $Q_2$ is rendered conductive. At the same time, the transistors $Q_4$ and $Q_5$ of the discharge circuit 106 are rendered non-conductive, so that the discharge circuit 106 is isolated from the capacitor 105, and thus the charge circuit 107 is operatively connected with the capacitor 105. The charge circuit 107 may be constituted by transistors $Q_6$, $Q_7$ and resistors $R_8$, $R_9$, $R_{10}$ as shown in the drawing, and it has a charge rate corresponding to a predetermined acceleration $G_2$ depending upon the constants of the elements constituting the circuit 107. When the transistor $Q_3$ of the mode change-over circuit 108 is turned on, and the transistors $Q_6$ and $Q_7$ of the charge circuit 107 are also turned on, the circuit 107 is operatively connected with the capacitor 105 as mentioned above. Thus, upon conduction of the transistor $Q_3$, the voltage across the capacitor 105 is discharged to the input voltage (actual wheel velocity voltage) through diode $D_2$, transistor $Q_2$ and operational amplifier OP until the voltage across the capacitor 105 becomes balanced with respect to $V_W$. If the voltage $V_W$ drops further, the capacitor 105 will also further be discharged through the diode $D_2$, transistor $Q_2$ and operational amplifier OP. In case $V_W$ starts increasing, the output potential of the operational amplifier will increase due to the fact that the latter operates so that the voltage between the (+) and (−) input terminals thereof is always zero, with a result that the transistor $Q_2$ and diode $D_2$ are cut off so that the voltage across the capacitor 105 will build up in accordance with the aforementioned charge rate of the charge circuit 107 as follows:

$$V_{T2} = V_2 + \frac{1}{C}\int i_2\,dt$$

where $i_2$ is the charge current. At this point, if the build-up rate of the voltage $V_W$ is lower than $$\frac{1}{C}\int i_2\,dt$$

the capacitor will immediately be charged with the current $i_2$ until the relationship between $V_{T2}$ and $V_W$ becomes
$$V_{T2} = V_W$$

Then, the voltage across the capacitor 105 will follow the actual wheel velocity voltage waveform $V_W$. In case, however, the build-up rate of the voltage $V_W$ is higher than $$\frac{1}{C}\,i_2\,dt$$

the transistor $Q_2$ and diode $D_2$ of the directional change-over circuit 104 are rendered non-conductive $(V_W > V_{T2})$, so that the voltage $V_{T2}$ across the capacitor 105 becomes $$V_{T2} = V_2 + \frac{1}{C}\int i_2\,dt$$

Thus, the voltage across the capacitor builds up with a gradient of $G_2$ in accordance with the expression $$\frac{1}{C}\int i_2\,dt$$

while departing from the value of $V_2$ with the point where the build-up rate of the voltage $V_W$ exceeds that of the abovementioned expression as a take-off point. In this case, unless the build-up rate of the voltage $V_W$ drops so that the voltage waveform $V_W$ again crosses the curve defined by $$V_W = V_2 + \frac{1}{C}\int i_2\,dt$$

the reference velocity will never be changed. In case, however, the voltage waveform $V_W$ crosses the aforementioned curve, the build-up rate of the voltage $V_W$ again exceeds $$\frac{1}{C} \int i_2 \, dt$$

with a result that a new reference velocity is obtained.

The reference velocity voltage given by $$V_{T2} = V_2 + \frac{1}{C} \int i_2 \, dt$$

is imparted to one of the input terminals of the comparator 11, and the voltage $V_W(1 - k_2)$ (see FIG. 3B) obtained by dividing the actual wheel velocity voltage by means of the divider circuit $DV_2$ is applied to the other input terminal of the comparator 111. The comparator 111 compares the voltages so as to provide an output at a point of time when the relationship between $V_W$ and $V_{T2}$ becomes $$V_W(1 - k_2) \geqq V_{T2}$$

that is, at a point of time $t_2$ as shown in FIG. 3B. The output of the comparator 111 is imparted to reset the latch circuit 112, so that the control signal which has been provided to the solenoid 113 vanishes. In this way, the brake pressure relief will be stopped.

In case the actual velocity is not restored despite a command for brake pressure relief, the brake pressure will remain relieved. To cope with this, the valve timer 115 is provided which is adapted to perform a kind of fail-safe function. That is, the valve timer 115 serves to turn off the latch circuit 112 to eliminate the brake pressure relief in case no command for cessation of the brake pressure relief is given even after a lapse of an empirically fixed period of time.

The inhibit timer 116 is provided for the following purpose. The brake pressure control is normally repeated at a rate of several cycles per second, and the waveform representing the actual wheel velocity tends to include noisy waveform portions which are undesirable for the control. To cope with this, the inhibit timer 116 is so designed as to make the comparison voltage constituting a command for initiation of brake pressure relief deeper than the empirically expected noise level within a certain period of time (portions indicated by $V_{T1}(1 - k_1')$ between $t_2$ and $t_3$ and between $t_5$ and $t_6$ in FIG. 3A) after the brake pressure relief has been ceased, thereby preventing erroneous operation.

Although, in the foregoing, description has been made of the case where the discharge circuit 106 and charge circuit 107 are alternately switched, it is also possible that either the charge circuit 107 may always remain connected with the capacitor 105 or the circuit 107 may be constructed as a charge circuit which may always remain connected with the capacitor 105 so that the charge circuit 106 alone may be selectively connected with the capacitor. Alternatively, charge circuit 107 per se may be eliminated.

Figure 5:
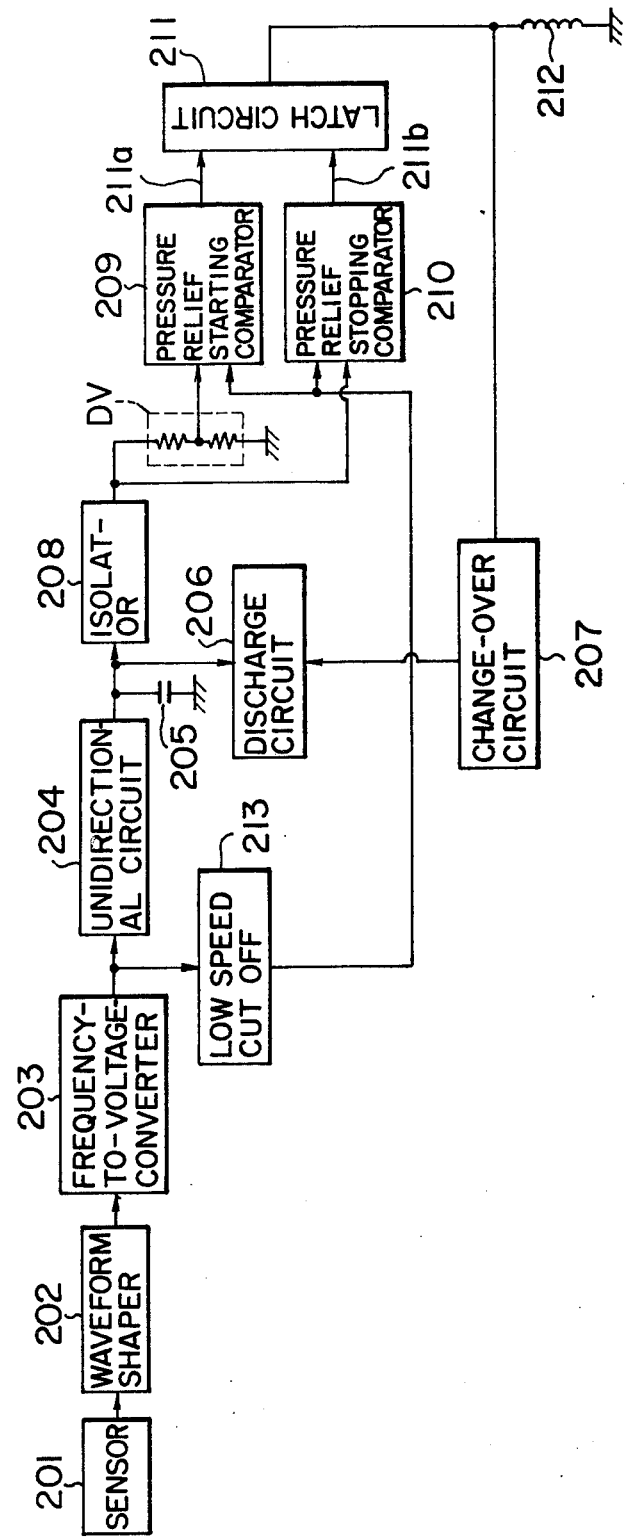
FIG. 5 is a block diagram showing the antiskid system according to a further embodiment of this invention.
Figure 7:
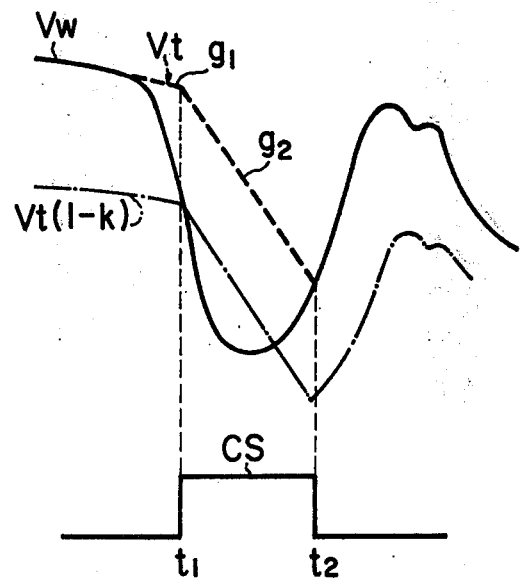
FIG. 7 illustrates waveforms occurring in the system of FIG. 5.

Referring to FIG. 5, there is shown a further embodiment of this invention, wherein the actual velocity of the wheels of a vehicle is detected by means of a sensor 201 provided in direct or indirect association with the wheels, and an output waveform available from the sensor is shaped in a suitable waveform shaping circuit 202 and then passed to a suitable frequency-to-voltage converter circuit 203, so that a signal waveform such as indicated by $V_W$ in FIG. 7 which corresponds to the actual wheel velocity is obtained at the output side of the converter circuit 203.

Figure 6:
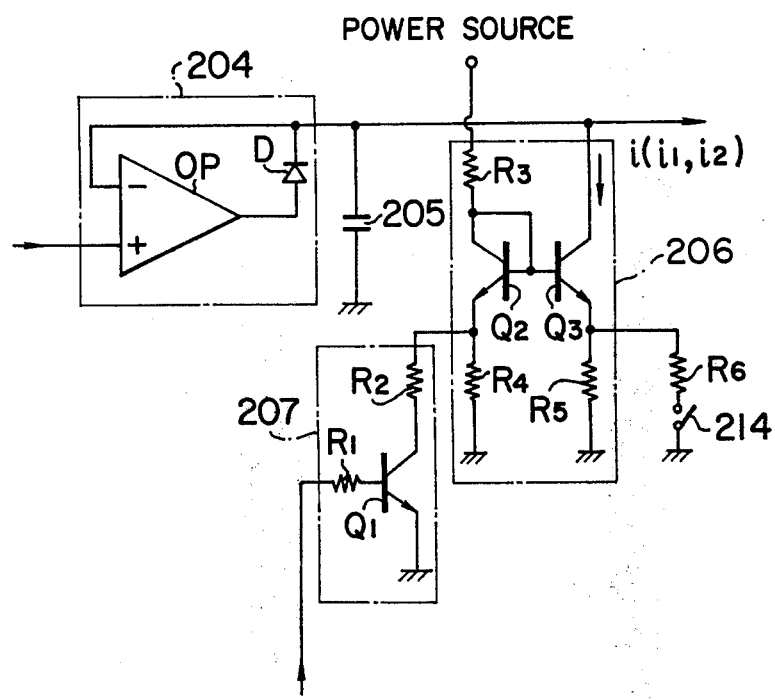
FIG. 6 is a circuit diagram showing the important portion of the system shown in FIG. 5.

At the output side of the converter circuit 203 is provided a unidirectional circuit 204, an example of which is shown in FIG. 6, and at the output side of the unidirectional circuit 204 is provided a capacitor 205 having one end thereof grounded. A discharge circuit 206 is connected to the connection point between the unidirectional circuit 204 and the capacitor 205. An example of the discharge circuit 206 is shown in FIG. 6.

The discharge circuit 206 is so designed that its discharge rate can be changed from a value corresponding to a predetermined deceleration $G_1$ to a value corresponding to another predetermined deceleration $G_2$ in the below-mentioned manner by a changer-over circuit 207. There are also provided an isolator circuit 208, a pressure relief starting comparator 209 and a pressure relief stopping comparator 110. The comparator 209 is connected to the set input terminal 211a of a latch circuit 211 which may be constituted by a monostable multivibrator or the like, for example, and the comparator 210 is connected to the reset input terminal 211b of the circuit 211. DV is a divider circuit for setting up a reference for waveform comparison. Reference numeral 212 indicates a solenoid associated with a brake pressure control valve (not shown), and 213 a low speed cut-off circuit. The solenoid 212 is provided with such a control signal as shown at CS in FIG. 7 so that desired control of brake pressure relief can be effected.

Description will now be made of the example shown in FIG. 6. The unidirectional circuit 204 may be constructed by connecting an operational amplifier OP and a diode D as shown in the drawing, and it is adapted to cause the capacitor 205 to be charged in accordance with the actual wheel velocity signal waveform $V_W$. Assuming that the wheel velocity drops and that the voltage across the capacitor 205 is $V_t$, any reverse current is blocked by the diode D when the voltage $V_t$ becomes $V_W < V_t$, so that $V_t$ holds the peak value of the voltage $V_W$. In actuality, however, the voltage $V_t$ acros the capacitor 205, when the voltage $V_t$ becomes $V_W < V_t$, drops in accordance with $$V_t - \frac{1}{C} \int i \, dt$$

(where C is the capacitance value of the capacitor 205, and $i$ is the discharge current flowing through the collector of the transistor $Q_3$ of the circuit 206) due to the fact that the capacitor 205 is connected to constant current circuit constituted by transistors $Q_1$, $Q_2$, $Q_3$ and resistors $R_1$, $R_2$, $R_3$, $R_4$, $R_5$, that is, a discharge circuit 206 and change-over circuit 207. For this reason, the voltage $V_t$ which follows $V_W$ before the point where the voltage $V_t$ becomes $V_W < V_t$ is reached, departs from the actual wheel velocity signal waveform $V_W$ as shown in FIG. 7 when the voltage $V_t$ becomes $V_W < V_t$ and the drop rate of the voltage $V_W$ becomes greater than a deceleration $G_1$ given by $$-\frac{1}{C} \int i \, dt = -G_1$$

Thereafter, the voltage $V_t$ will drop along a line $g_1$ tangential to the waveform $V_W$ and with a gradient corresponding to the deceleration $G_1$.

When the discharge rate of the discharge circuit 206 has a value corresponding to the deceleration $G_1$, that is, when the transistor $Q_1$ of the change-over circuit 207 is non-conductive, there is produced a reference velocity signal which decreases in accordance with $$V_t - \frac{1}{C} \int i_1 dt$$

where the current $i_1$ is determined by the transistors $Q_2$, $Q_3$ and resistors $R_3$, $R_4$, $R_5$ of the discharge circuit 206. The reference velocity signal thus produced is divided with a predetermined dividing ratio by the divider circuit DV so as to provide $V_t(1-k)$ (see FIG. 7). The thus divided signal and actual wheel velocity signal $V_W$ are passed to the input terminals of the comparator 209 so as to be compared with each other. As a result of this comparison, the comparator provides an output at a point of time when $V_W < V_t(1-k)$, that is, at a point of time $t_1$ as shown in FIG. 7, whereby the latch circuit 211 is set so that a control signal such as shown at CS in FIG. 7 is imparted to the solenoid 212. In this way, a command for brake pressure relief is provided to start the brake pressure relief.

At the same time, the control signal CS which is the output of the latch circuit 211, is imparted the base of the transistor $Q_1$ so that the latter is rendered conductive. Thus, the aforementioned discharge current $i_1$ is changed from a value which is a function of the resistor $R_4$ to a new value which depends on the parallel resistors $R_2$ and $R_4$. In this way, at the point of time $t_1$, the discharge rate of the discharge circuit 206 is changed to a value corresponding to predetermined deceleration $G_2$. As a result, after the point of time $t_1$, the voltage $V_t$ across the capacitor 205 varies along a straight line with a gradient corresponding to the deceleration $G_2$ as shown in FIG. 7, that is, in accordance with the following equation:

$$-G_2 = \frac{1}{C} \int i_2 dt$$

The voltage $V_t$ and actual wheel velocity signal $V_W$ are then compared with each other in the comparator 210. At a point of time when the signal $V_W$ exceeds a voltage defined by $g_2$, that is, at a point of time $t_2$ as shown in FIG. 7, the comparator 210 is caused to provide an output by which the latch circuit 211 is reset so that the control signal which has been provided to the solenoid 212 vanishes. Thus, the command for the brake pressure relief is eliminated, and consequently the brake pressure relief is ceased. At this point, the current of circuit 206 is automatically returned to the original value $i_1$. In this way, one cycle of the control has been completed.

Although, in the foregoing, description has been made of the case where $|G_1| < |G_2|$, it is also possible to make $|G_1| > |G_2|$; in such a case, resistor $R_2$ may be connected to the emitter of the transistor $Q_3$ instead of to the emitter of the transistor $Q_2$.

Furthermore, it is also possible to selectively connect an additional resistor $R_6$ to the emitter of the transistor $Q_3$ of the circuit 206 by the use of switch means 214 such for example as mercury switch or the like as shown in FIG. 6, thereby setting the discharge rate of the circuit 206, i.e. $G_1$ and/or $G_2$ to a different value depending on the road condition.

Figure 8:
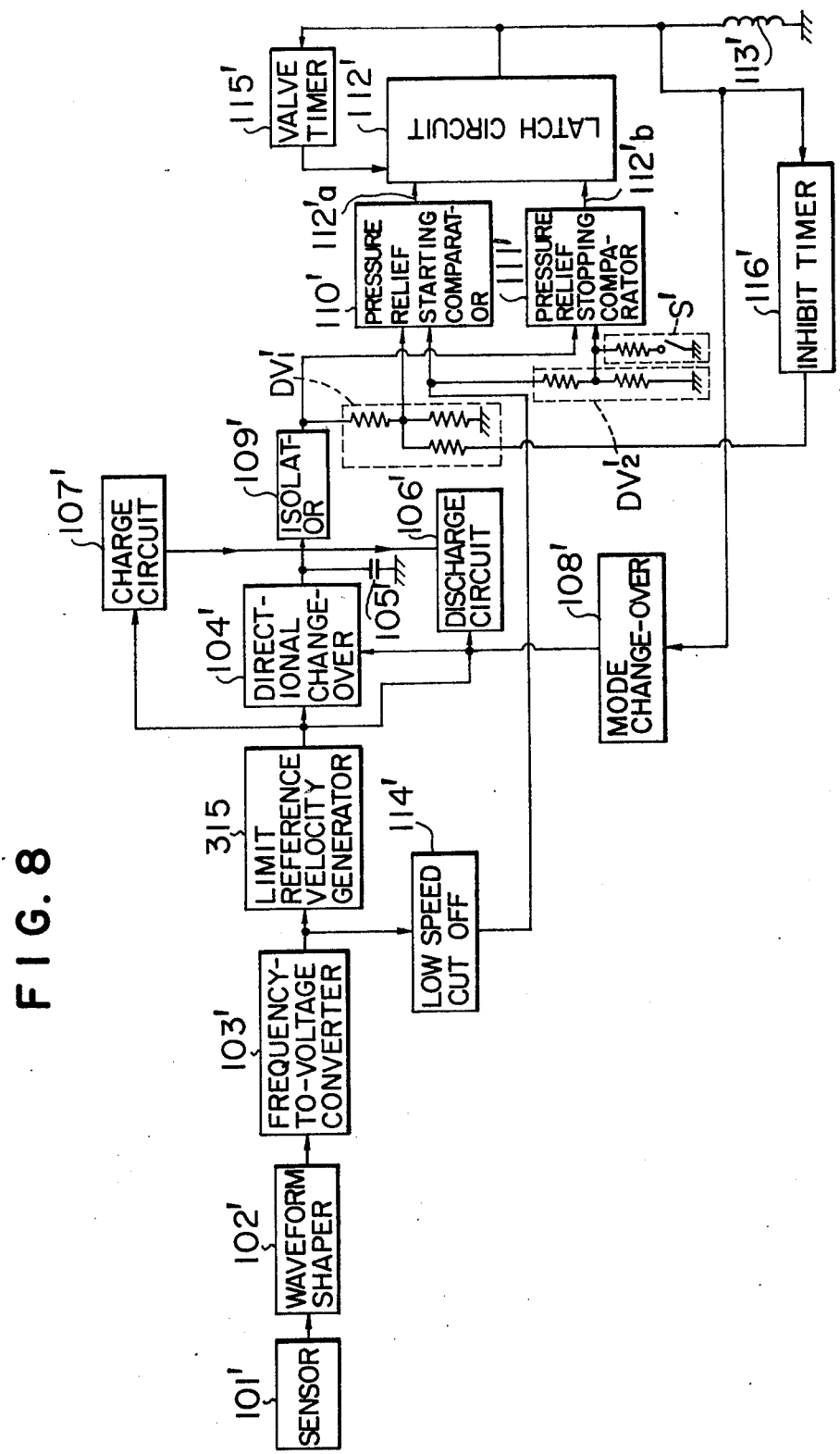
FIG. 8 is a block diagram showing the antiskid system according to a still further embodiment of this invention.

Referring next to FIG. 8, there is shown a still further embodiment of this invention, which is similar to the embodiment of FIG. 2 except that there is provided a limit reference velocity generating circuit 315. In this figure, therefore, parts corresponding to those of FIG. 2 are indicated by similar numerals with apostrophe. In this embodiment, the actual velocity of the wheels of a vehicle (not shown) is detected by means of a sensor 101' which is provided in direct or indirect association with the wheels. An output waveform available from the sensor 101' is in turn shaped in a waveform shaping circuit 102', and then passed to a frequency-to-voltage converter circuit 103', which provides at the output thereof a waveform $V_W$ (referred to as actual wheel velocity signal waveform hereinafter) which corresponds to the actual wheel velocity.

Figure 9:
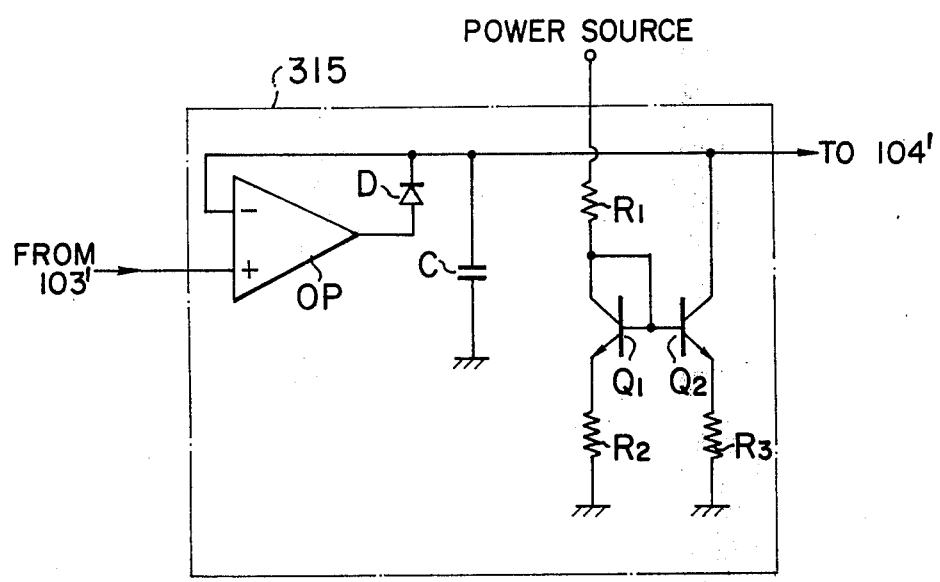
FIG. 9 is a circuit diagram showing the important portion of the system shown in FIG. 8.

At the output side of the converter circuit 103' is provided the limit reference velocity generating circuit 315, an example of which is shown in FIG. 9, and at the output side of the circuit 315, there is provided a directional change-over circuit 104'.

The limit reference velocity generating circuit 315 shown in FIG. 9 functions in the same way as the circuit 206 of FIG. 6 does if the elements 207 and 214 are separated therefrom. A discharge current depending on the constants of transistors $Q_1$, $Q_2$ and resistors $R_1$, $R_2$, $R_3$ which constitute a discharge circuit, may be so selected as to have a value corresponding to a deceleration $G_0$ defining a limit reference velocity in case the wheel velocity drops anomalously. The deceleration may usually be of a value in the range from $-4G$ to $-6G$. By so doing, it will be possible to obtain such a signal waveform as shown in FIG. 10A which represents the relationship between the actual wheel velocity $V_W$ and the limit reference velocity $V_W'$. The resulting signal $V_W$ is utilized as an input to the directional change-over circuit 104' shown in FIG. 8, whereby the following function can be performed.

Since the deceleration $|G_0|$ is always greater than the deceleration $|G_1|$ which constitutes a reference of the command for brake pressure relief, the control point for starting the brake pressure relief occurs at a point of time $t_1$ when the wheel velocity becomes $$V_W \leq V_{T1}(1 - k_1)$$

and as a result, such a control signal as shown in FIG. 10C is imparted to energize the solenoid 113'. The process of this brake pressure relief starting command is completely the same as that described in connection with FIG. 2. Upon energization of a solenoid 113', the directional change-over circuit 104' is switched by a mode change-over circuit 108' in the same manner as that described in connection with FIG. 2, and the output of the limit reference velocity generating circuit 315 is fed to the directional change-over circuit 104'. Thus, if any anomalous drop occurs in the actual wheel velocity as shown in FIG. 10B, then the aforementioned signal $V_W'$ will vary along a straight line with a gradient of $G_0$, so that $V_{T2}$ may be traced. Thus, the point where the brake pressure relief stopping command is generated occurs at a point of time when the following relationship is established:

$$V_W(1 - k_2) \geq V_{T2}$$

As will be readily apparent to those skilled in the art, in absence of the circuit 315, therefore, a brake pressure relief command is given at a point as shown by a dotted line in FIG. 10C, thus resulting in an insufficient relief of the brake pressure, which is very liable to lead to early locking. In the usual case that there occurs no anomalous deceleration such as $G_0$ in the actual wheel velocity $V_W$, the following equation always hold:

$$V_w = V_w'$$

In such a case, therefore, the system according to this embodiment operates in exactly the same way as that shown in FIG. 2.

As will be appreciated from what has been described just above, in accordance with the greatly simplified arrangement of FIG. 8 which is constructed simply by adding the limit reference velocity generating circuit 315 to the arrangement of FIG. 2, it is possible to very effectively prevent early locking which tends to be caused due to an anomalous drop of the wheel velocity at the first control cycle as counted from the point of time when the brake pedal was depressed, under conditions that the rear wheels are very liable to be locked as in the case where panic spike braking is effected, the road surface is of a low frictional coefficient like an ice-covered road surface, or a truck is non-loaded, for example.

While preferred embodiments of this invention have been described in detail, it will be obvious to those skilled in the art that the invention may be embodied otherwise without departing from its spirit and scope.

What is claimed is:

1. A brake control system for an automotive vehicle for preventing skids resulting from early locking of the vehicle's wheels comprising:
   a. a first means for generating a first signal voltage representing the vehicle's wheel velocity;
   b. a second means for continuously generating a second signal, said second signal representing an extremum of said first signal;
   c. a driving means for generating a signal for controlling a brake pressure control valve to release and reapply brake pressure;
   d. a connecting means in circuit with said second means and said driving means for causing said second means to switch said second signal between values corresponding to maximum and minimum values of said first signal responsive to said driving means signal; and
   e. a comparing means for comparing said first and second signals and for providing a signal for operating said driving means.

2. A brake control system according to claim 1, wherein:
   a. said second means includes a first circuit means for providing a first differential value or first slope instead of said maximum value and a second circuit means for providing a second differential value or second slope instead of said minimum value;
   b. said second means produces as a modification of said second signal a third signal which comprises a first segment leaving said first signal at said first slope thereof when said first slope occurs and a second segment leaving said first signal at said second slope thereof when said second slope occurs; and
   c. said brake control system further comprises comparing means for comparing said first and third signals and for providing a signal for operating said driving means.

3. A brake control system according to claim 2, wherein said second means further comprises a reference velocity generating means for providing a third slope for said second segment of said third signal in response to an anomalous drop in said first signal, said third slope being adapted to delay the operative connection of said second circuit means of said second means by said connecting means until the time of equality of said first signal and said second segment of said third signal.

4. A method for preventing skidding of automotive vehicles due to premature locking of brakes comprising of the steps of:
   a. providing a first signal proportional to a vehicle's wheel velocity;
   b. providing a brake-relief signal in response to said first signal dropping more than a first fixed percentage from a peak value thereof;
   c. removing said brake relief signal in response to said first signal increasing more than a second fixed percentage from a minimal value thereof;
   d. generating the minimal value of said first signal in response to the application of said brake relief signal; and
   e. generating the peak value of said first signal in response to the removal of said brake-relief signal.

5. A method according to claim 4, wherein said peak value of said first signal is modified to be a first segment of a second signal which, when the slope of a tangential line of said first signal becomes equal to a predetermined first slope, decreases along said tangential line, and wherein said minimal value of said first signal is modified to be a second segment of said second signal which, when the slope of another tangential line of said first signal becomes equal to a predetermined second slope, varies along said another tangential line.

6. A method according to claim 5, wherein in case said first signal drops at an anomalous rate, a third signal is produced which, when the slope of a tangential line of said first signal becomes equal to a predetermined third slope corresponding to said anomalous rate, decreases along said tangential line, and wherein the production of said second segment of said second signal is delayed until the occurrence of a condition of equality of said third and first signals, whereby brake-relief is maintained for longer periods of time in anomalous situations.

7. A brake control system for an automobile vehicle for preventing skids resulting from early locking of the vehicle's wheels comprising:
   a. a first signal generating means for providing a first signal proportional to said vehicle's wheel velocity;
   b. a second signal generating means responsive to conditions of said first signal for providing a second signal comprising a first segment including a portion of a first predetermined slope of constant magnitude and a second segment including a portion of a second predetermined slope of constant magnitude;
   c. divider means comprising a first divider means for providing a fourth signal by proportionally reducing said second signal and a second divider means for providing a fifth signal by proportionally reducing said first signal;
   d. said second means including third, fifth and seventh means for generating said first segment of said second signal in a first state, and for causing said first segment of said second signal to be equal to and to follow said first signal during a period wherein said first signal has a slope which is more positive than said first slope, as well as for causing said first segment of said second signal to have said first slope without following said first signal for a period of time between a time when said first signal has a tangential line of a slope equal to said first slope, and a time when said fourth signal crosses said first signal, wherein:
  1. said seventh means comprises a storage means,
  2. said fifth means comprises charging circuit means for causing said seventh means to provide that portion of said first segment of said second signal which follows said first signal, and
  3. said third means comprises circuit means for causing said seventh means to provide said first slope for said first segment of said second signal;
e. said second means further including fourth and sixth means for providing said second segment of said second signal in a second state in cooperation with said seventh means, and for causing said second segment of said second signal to be equal to and following said first signal during a period that said first signal has a slope which is more negative than said second slope, as well as for causing said second segment of said second signal to have said second slope without following said first signal for a period of time between a time when said first signal has a second tangential line of a slope equal to said second slope, and a time when an extension of said second tangential line crosses said fifth signal, wherein:
  1. said sixth means comprises discharging circuit means for causing said seventh means to provide said second segment of said second signal; and
  2. said fourth means comprises circuit means for causing said seventh means to provide said second slope for said second segment of said second signal;
f. a command means for generating a third signal;
g. a change-over means in circuit with said second means and responsive to said third signal to cause said second means to generate said first segment of said second signal in said first state and said second segment of said second signal in said second state;
h. said change-over means being adapted to cause said third and fifth means and said fourth and sixth means to be alternately activated according to whether there occurs said first state corresponding to an inactive mode of said third signal or said second state corresponding to an active mode of said third signal;
i. a brake relief means for relieving braking action on said vehicle in response to said third signal;
j. comparing means comprising a first comparing means for comparing said first and fourth signals in said first state and a second comparing means for comparing said second and fifth signals in said second state, wherein;
  1. said first comparing means produces a sixth signal in response to equality of said first and fourth signals in said first state, and said sixth signal activates said command means, and
  2. said second comparing means produces a seventh signal in response to equality of said second and fifth signals in said second state, and said seventh signal deactivates said command means.

8. A brake control system according to claim 7, wherein said second means further comprises a reference velocity generating means for generating an eighth signal to provide a third slope for said second signal in said second state in response to an anomalous drop in said first signal, said eighth signal being provided as an input to said second means, said third slope being adapted to last until the time of equality of said first and second signals and to delay the operative connection of said seventh means by said change-over means until said time of equality.

9. A method for preventing skidding of automotive vehicles due to premature locking of brakes comprising the steps of:
  a. producing a first signal proportional to a vehicle's wheel velocity;
  b. producing a first segment of a second signal as a modification of said first signal by providing a fixed first slope therefor whenever said first signal decreases at a rate in excess of said first slope in a first state;
  c. producing a third signal equal to a fraction of said second signal;
  d. generating a brake relief signal in response to a condition of equality of said first and third signal, thereby causing said first segment of said second signal to be equal to and follow said first signal;
  e. producing a second segment of said second signal during a second state, when said brake-relief signal is being generated, by providing a fixed second slope for said first signal whenever said first signal increases at a rate in excess of said second slope;
  f. producing a fourth signal equal to a fraction of said first signal; and
  g. ceasing the generation of said brake-relief signal in response to a condition of equality of said fourth and second signals, thereby causing said second segment of said second signal to be equal to and follow said first signal;
  wherein said steps (d) to (g) constitute one cycle of control operation, whereby brake relief is provided to prevent wheel locking when said vehicle is decelerating and in danger of having its wheels lock, and whereby said relief is removed when said vehicle is not in such danger.

10. A method according to claim 9, further comprising the steps of:
  a. producing a fifth signal having a portion of a fixed third slope as a modification of said first signal by providing said third slope for said fifth signal whenever said first signal decreases at an anomalous rate; and
  b. delaying the production of said second segment of said second signal until the occurrence of a condition of equality of said fifth and first signals, whereby brake-relief is maintained for longer periods of time in anomalous situations.

* * * * *